United States Patent [19]

Adkins

[11] Patent Number: 4,976,349
[45] Date of Patent: Dec. 11, 1990

[54] AEROFOIL/HYDROFOIL

[75] Inventor: Richard C. Adkins, Milton Keynes, England

[73] Assignee: Cranfield Institute, England

[21] Appl. No.: 201,177

[22] Filed: Jun. 2, 1988

[30] Foreign Application Priority Data

Jun. 4, 1987 [GB] United Kingdom ............... 8713097

[51] Int. Cl.$^5$ .............................................. B64C 21/04
[52] U.S. Cl. ................................. 244/207; 244/198; 244/204
[58] Field of Search ............... 244/198, 204, 206, 207, 244/200; 114/274, 278

[56] References Cited

U.S. PATENT DOCUMENTS

| 1,674,169 | 6/1928 | Flettner | 440/37 |
| 1,714,609 | 5/1928 | Massey | 244/206 |
| 2,569,983 | 10/1951 | Favre | 244/206 |
| 2,809,793 | 10/1957 | Warner | 244/208 |
| 3,178,131 | 4/1965 | Laing | 244/206 |
| 4,117,995 | 10/1978 | Runge | 244/207 |
| 4,146,197 | 3/1979 | Grotz | 244/204 |
| 4,285,482 | 8/1981 | Lewis | 244/207 |
| 4,848,701 | 7/1989 | Belloso | 244/207 |

FOREIGN PATENT DOCUMENTS

| 1951422 | 4/1971 | Fed. Rep. of Germany . |
| 927914 | 12/1947 | France . |
| 106667 | 2/1943 | Sweden ................ 244/206 |
| 1435306 | 5/1976 | United Kingdom . |

Primary Examiner—Sherman Basinger
Assistant Examiner—Anne Sartelle
Attorney, Agent, or Firm—Venable, Baetjer and Howard

[57] ABSTRACT

An aerofoil or hydrofoil (1) has a vessel (2) for providing a high velocity jet of fluid directed from a nozzle (3) in a direction having a component of velocity in the same direction as the required direction of lift (L). The aerofoil or hydrofoil (1) also has a curved surface (5) convex on the side of the aerofoil or hydrofoil which is in the direction of the required lift, and which serves to direct the velocity of the jet in a direction which is substantially opposite to the direction of the required lift or thrust force, the primary jet being directed over the convex surface for attachment thereto; and a duct formed over a rear part of the convex surface remote from the nozzle, whereby the primary jet of fluid flowing over and attached to the convex surface causes an enhanced flow through the duct, the duct being directed at least at its exit end in a direction so that the flow therethrough has a component of velocity opposite that of the required direction of lift.

8 Claims, 2 Drawing Sheets

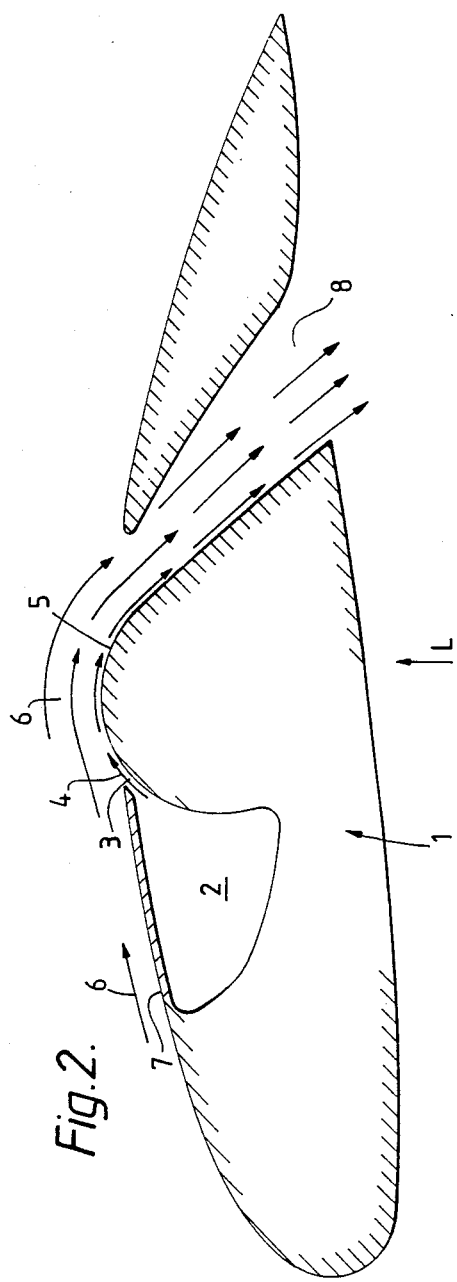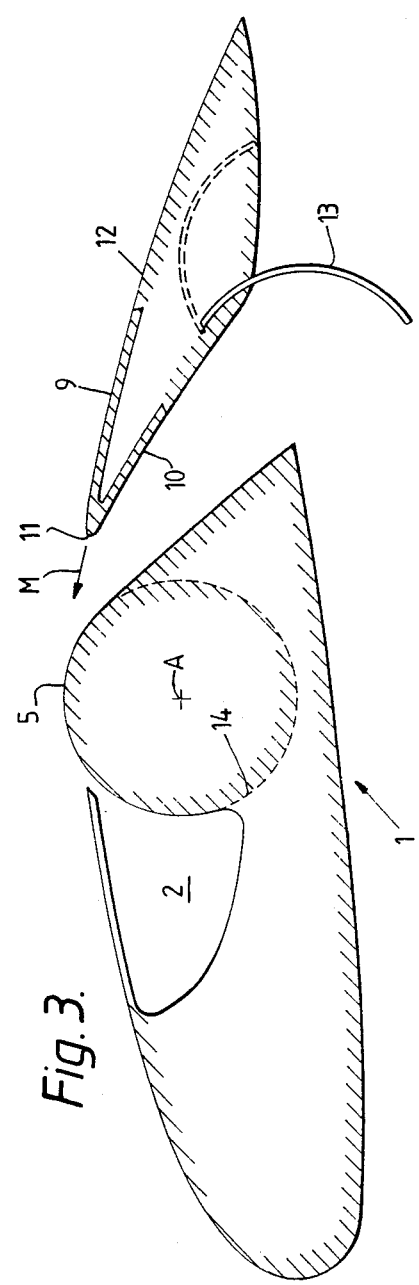

AEROFOIL/HYDROFOIL

BACKGROUND OF THE INVENTION

The present invention relates to aerofoils or hydrofoils and, more particuarly, to an aerofoil or hydrofoil having improved lift or thrust characteristics.

Conventionally, aerofoils and hydrofoils are designed to provide maximum lift at a chosen forward velocity or narrow range of velocities, increased lift being provided, when required, by movable flaps, both leading edge flaps and trailing edge flaps.

It has been proposed to utilize the so-called "jet-pump" principle to provide increased lift on an aerofoil or hydrofoil. A jet-pump comprises a high velocity but relatively low mass flow rate primary jet to induce a flow of secondary, ambient fluid in order to enhance the mass flow rate.

SUMMARY OF THE INVENTION

According to the present invention, an aerofoil or hydrofoil is provided that includes means for providing a high velocity jet of fluid directed from a nozzle in a direction having a component of velocity in the same direction as the required direction of lift; a curved surface convex on the side of the aerofoil or hydrofoil which is in the direction of the required lift, and which serves to direct the velocity of the jet in a direction which is substantially opposite to the direction of the required lift or thrust force, the primary jet being directed over the convex surface for attachment thereto; and a duct formed over a rear part of the convex surface remote from the nozzle, whereby the primary jet of fluid flowing over and attached to the convex surface causes an enhanced flow through the duct, the duct being directed at least at its exit end in a direction so that the flow therethrough has a component of velocity opposite that of the required direction of lift.

Such an aerofoil or hydrofoil is thus able to make use of the so-called "Coanda" effect to produce increased lift in the required direction of lift by causing the primary jet to be attached either directly or indirectly to the convex surface in order to induce mixing between the primary jet and surrounding ambient fluid to improve the rate of mixing between the primary jet and entrained fluid such that there is an accompanying pressure reaction force from the solid boundary of the aerofoil or hydrofoil which results in an augmentation of thrust or lift in the required direction.

If desired, in certain circumstances, a non-convex, for example concave, surface may be interposed between the nozzle and the convex surface.

Preferably, the resultant of the forces acting as a result of the primary jet and entrained ambient fluid is substantially aligned with the axis of lift or required thrust.

If desired, the duct may be adjustable to direct fluid flow to it either in a direction with a velocity component in the same sense as the direction of motion of the aerofoil or hydrofoil, thereby providing a means of thrust reversal, or to direct fluid flow in a direction with a velocity component in the opposite sense to the direction of motion of the aerofoil or hydrofoil, thereby providing a means of thrust enhancement.

BRIEF DESCRIPTION OF THE DRAWINGS

The invention will now be illustrated with reference to the accompanying drawings in which:

FIG. 2 is a diagrammatic cross-sectional view through an aerofoil according with the present invention; and, FIG. 3 is a view similar to FIG. 2 showing a modified aerofoil section.

DETAILED DESCRIPTION OF THE PREFERRED EMBODIMENT

Figure 1:
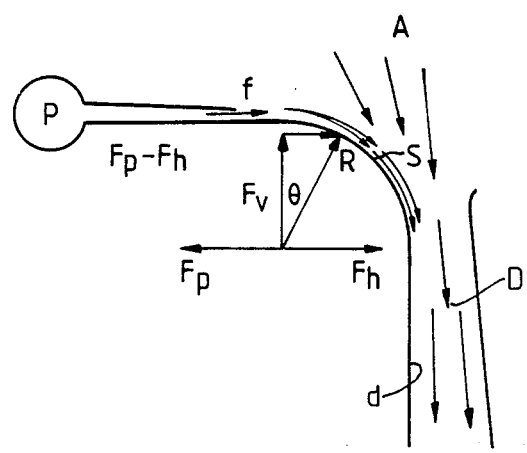
FIG. 1 is a diagrammatic view illustrating the principles embodied in the present invention.

To illustrate the principle of the present invention FIG. 1 shows a high velocity jet of fluid f exiting from a pressure vessel "P", the jet being released close to a convexly curved surface "s". A non-convex surface "N" can optionally be interposed between the pressure vessel "P" and the convex surface "s", as shown. At the rear of the curved surface "s" is formed a diverging, diffusion duct "D", one side "d" of which is an extension of the curved surface "s". The primary jet of fluid "f" attaches itself to the convex surface "s" (the Coanda effect) and moves around the surface. By means of the well-known jet-pump effect, the jet of fluid "f" causes ambient fluid "A" to be entrained with the fluid "f" thus increasing the mass flow rate through the duct "D". The balance of forces acting on the body forming the pressure vessel "P", curved surface "s" and duct "D" are as shown in FIG. 1, where $F_p$ is the reaction force of the high pressure jet "f" on the pressure vessel "P", $F_v$ is the reaction force of the primary and entrained fluid in the vertical direction, $F_h$ is the horizontal reaction force on the curved surface ($F_h$ being approximately equal to $F_v$ and in turn greater than $F_p$), "R" is the resultant force on the body, and "$\theta$" is the angle of the resultant force to the vertical.

It will readily be appreciated that with $F_v$ and $F_h$ being substantially similar in magnitude, the resultant "R" will lie at some angle around 45° to the vertical. Advantageously, therefore, when applying this to the generation of lift in an aerofoil, the direction of "R" will be arranged to be in the direction of lift, that is to say, in general, substantially vertical.

FIG. 2 illustrates diagrammatically an aerofoil or hydrofoil 1 which has a vessel 2 or other means of supplying pressurized fluid to a nozzle 3 so as to release a primary jet 4 of fluid over a convexly curved surface 5, not necessarily of circular section, the primary jet 4 eventually or directly attaching to the convex surface 5. The means for supplying pressurized fluid may be a fan, pump or other conventional fluid moving device. The convexly curved surface may include discontinuities (not shown) in order to encourage mixing between the primary jet and the ambient fluid 6 and in some applications it may be appropriate to rotate the convexly curved surface in order to control the direction of the attached jet at its furthest extremity. Further improvement to the rate of mixing between the primary jet and entrained fluid can be obtained by increasing the radius of curvature of the convex surface so that the radius of curvature increases in the direction of flow. In some applications, on cessation of the primary jet, the convex surface 5 may be retracted, partly or wholely, into the aerofoil/hydrofoil main body 1 or otherwise closed in order not to impede the passage of the surrounding ambient flow.

The profile of the convex surface is shaped so as to promote the efficient mixing of the primary jet and surrounding ambient fluid. It is the intention here that efficient mixing is promoted when there is an accompanying pressure reaction force from a solid boundary, which reaction force is substantially in line with the local flow direction which itself may be in the same or opposite sense to the flow direction. In this manner, efficient mixing is achieved which results in an augmentation of thrust or lift force in the lift direction "L" and which can be accomplished within a relatively small increase in cross-sectional area between the exit of the primary jet and the section of the duct which delivers the mixed streams back to the ambient. By confining the overall cross-section of the flow, the distance in which the high velocity jet must spread in order to mix with the entrained stream is limited, and this reduces the streamwise distance needed to achieve adequate mixing between the two streams. The reduced mixing length then results in reduced frictional losses at the solid boundary.

An approach surface 7 on the aerofoil/hydrofoil guides part or all of the entrained ambient fluid 6 to the primary jet. This approach surface 7 may be made to move either linearly or rotationally by means (not shown) in order to form a smooth or near smooth tangential juncture with the upper region of the convexly curved surface 5 adjacent to or at its highest point, this movement being able to be performed preferably after the primary jet has been switched off.

A duct 8 is provided rearwardly of the convex surface to direct some or all of the flow leaving the convexly-curved surface 5 in a direction favourable to the resultant force required of the aerofoil/hydrofoil section. The cross-section of the duct 8 can be either constant or varying in the direction transverse to the majority of flow passing through it, but preferably the cross-sectional area increases slowly with flow direction as shown, as this is beneficial to the promotion of mixing between the primary jet and the entrained ambient fluid. The downstream end of this duct can have a system of guiding vanes to direct the release of the combined flow stream, thereby providing a further means of control of the direction of the resultant thrust.

FIG. 3 shows a diverter plate or plates 9,10 which may form one wall of the duct. The upper lip 11 of the aperture to the duct can be made to move generally in the direction "M" of the convexly curved surface (as indicated by the arrow in FIG. 3) by either linear or rotational means (not shown) so that part or all of the combination of primary jet and entrained fluid can be re-directed along the upper surface 12 of the downstream section of the aerofoil/hydrofoil.

A diverter plate 13 may also be provided so as to deflect the exit stream from the duct in a direction so as to provide vectoring control of the resultant force. When not required, this diverter plate 13 may be retracted back into the main body of the aerofoil/hydrofoil by appropriate mechanical means such as a hydraulic ram (not shown). In certain applications, this plate may be orientated or constructed so as to cause an extreme deflection of the jet and thus provide a resultant force opposite the direction of motion of the vehicle so as to perform thrust reversal.

FIG. 3 also shows how a circular cross-sectioned element 14 may be provided for rotation about a central axis "A", whereby the convex surface 5 can be caused to rotate as described above.

I claim:

1. An aerofoil or hydrofoil comprising:
   a curved convex surface on a side of the aerofoil or hydrofoil that is positioned in a direction of required lift;
   fluid supply means including a nozzle for providing a high velocity primary jet of fluid directed to the curved surface to entrain and control the direction of a flow of secondary fluid;
   a duct formed over a rear part of the convex surface downstream of said nozzle and extending from said convex surface to a surface of the aerofoil or hydrofoil remote from the convex surface;
   whereby the convex surface, fluid supply means and duct are arranged to provide that a majority portion of the combined primary and secondary fluid flow is directed into the duct, the duct being directed at least at its exit end in a direction such that flow therethrough has a component of velocity opposite that of the required direction of lift.

2. An aerofoil or hydrofoil according to claim 1, wherein a non-convex surface is interposed between the nozzle and the convex surface.

3. An aerofoil or hydrofoil according to claim 1, each of said primary and secondary fluid jets being subjected to a reaction force, wherein a resultant of the respective fluid reaction forces is arranged to be substantially aligned with an axis of the duct.

4. An aerofoil or hydrofoil according to claim 1, wherein the duct is adjustable to direct fluid flow thereto between a direction having a velocity component in the same sense as the direction of motion of the aerofoil or hydrofoil for providing a means of thrust reversal and a second direction having a velocity component in the opposite sense to the direction of motion of the aerofoil or hydrofoil for providing a means of thrust enhancement.

5. An aerofoil or hydrofoil according to claim 1, including means for deflecting the exit stream from the duct in a direction to provide vectoring control of the resultant force.

6. An aerofoil or hydrofoil according to claim 1, wherein the convex surface is rotatable about an axis transverse to the flow direction of the stream of fluid flowing over it.

7. An aerofoil or hydrofoil according to claim 1, wherein the convex surface is adjustable in position to vary primary jet fluid flow to said duct.

8. An aerofoil or hydrofoil according to claim 1, wherein said duct is flared outwardly from said convex surface.

* * * * *